United States Patent
Nge et al.

(10) Patent No.: US 11,592,884 B2
(45) Date of Patent: Feb. 28, 2023

(54) POWER MANAGEMENT OF DISCRETE COMMUNICATION PORT COMPONENTS

(71) Applicant: Intel Corporation, Santa Clara, CA (US)

(72) Inventors: Chee Lim Nge, Beaverton, OR (US); Chia-Hung Kuo, Folsom, CA (US); Nivedita Aggarwal, Portland, OR (US); Venkataramani Gopalakrishnan, Folsom, CA (US); Robert Gough, Beaverton, OR (US); Basavaraj Astekar, Portland, OR (US); Vijaykumar Kadgi, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/648,206

(22) PCT Filed: Jan. 25, 2018

(86) PCT No.: PCT/US2018/015307
§ 371 (c)(1),
(2) Date: Mar. 17, 2020

(87) PCT Pub. No.: WO2019/147253
PCT Pub. Date: Aug. 1, 2019

(65) Prior Publication Data
US 2020/0225722 A1 Jul. 16, 2020

(51) Int. Cl.
*G06F 1/26* (2006.01)
*G06F 1/3293* (2019.01)
(Continued)

(52) U.S. Cl.
CPC ............ *G06F 1/266* (2013.01); *G06F 1/3293* (2013.01); *G06F 9/4411* (2013.01); *G06F 13/4282* (2013.01); *G06F 2213/0042* (2013.01)

(58) Field of Classification Search
CPC ... Y02D 10/00; G06F 2213/0042; G06F 1/08; G06F 1/266; G06F 1/3278; G06F 1/26;
(Continued)

(56) References Cited

U.S. PATENT DOCUMENTS

| 7,010,607 B1 * | 3/2006 | Bunton | H04L 1/18 709/228 |
| 8,105,885 B1 * | 1/2012 | Lee | H01L 27/0207 438/129 |

(Continued)

FOREIGN PATENT DOCUMENTS

WO   2016-094320 A1   6/2016

OTHER PUBLICATIONS

International Search Report and Written Opinion dated Oct. 25, 2018 for International Application No. PCT/US2018/015307, 16 pages.

*Primary Examiner* — Faisal M Zaman
(74) *Attorney, Agent, or Firm* — Schwabe, Williamson & Wyatt, P.C.

(57) ABSTRACT

Apparatus and methods for managing power consumption of a data-path in a computer system are provided, the data-path comprising a first port and a second port, the first port comprising a high-speed and the second port comprising a low-speed port. The disclosed method including connecting a device to the data-path, determining that the connected device is to communicate using the second port and turning off an active circuit associated with the first port of the data-path.

23 Claims, 5 Drawing Sheets

(51) Int. Cl.
*G06F 9/4401* (2018.01)
*G06F 13/42* (2006.01)

(58) Field of Classification Search
CPC .... G06F 1/3253; G06F 1/3287; G06F 1/3203; G06F 1/3293
USPC .......................................... 713/323, 320, 322
See application file for complete search history.

(56) References Cited

U.S. PATENT DOCUMENTS

| | | | |
|---|---|---|---|
| 9,811,145 B2* | 11/2017 | Chen | G06F 1/3253 |
| 2005/0239518 A1* | 10/2005 | D'Agostino | G06F 1/3287 |
| | | | 455/574 |
| 2007/0186088 A1* | 8/2007 | Khatri | G06F 13/4018 |
| | | | 713/1 |
| 2007/0250728 A1* | 10/2007 | Riach | G06F 1/3203 |
| | | | 713/600 |
| 2010/0077471 A1* | 3/2010 | Schleiss | G05B 19/0428 |
| | | | 726/13 |
| 2011/0296215 A1* | 12/2011 | Mobin | G06F 1/3253 |
| | | | 713/323 |
| 2012/0017016 A1* | 1/2012 | Ma | G06F 13/426 |
| | | | 710/110 |
| 2012/0059964 A1* | 3/2012 | Foster | G06F 1/12 |
| | | | 710/300 |
| 2012/0066531 A1* | 3/2012 | Shafai | H04W 52/0206 |
| | | | 713/323 |
| 2012/0311312 A1* | 12/2012 | Hameed | G06F 9/4401 |
| | | | 713/2 |
| 2012/0324261 A1* | 12/2012 | Huang | G06F 1/3253 |
| | | | 713/320 |
| 2013/0013842 A1* | 1/2013 | Numamoto | G06F 13/4022 |
| | | | 710/316 |
| 2013/0034034 A1* | 2/2013 | Zhang | H04W 52/0216 |
| | | | 370/311 |
| 2013/0205148 A1 | 8/2013 | Huang et al. | |
| 2013/0332639 A1 | 12/2013 | Jiang et al. | |
| 2014/0281112 A1* | 9/2014 | Rao | G06F 13/40 |
| | | | 710/317 |
| 2015/0331826 A1* | 11/2015 | Ghosh | G06F 13/4027 |
| | | | 710/313 |
| 2016/0285757 A1* | 9/2016 | Srivastava | H04L 45/566 |
| 2016/0320828 A1* | 11/2016 | Liu | G06F 1/3287 |
| 2016/0321210 A1* | 11/2016 | Baterina | G06F 13/4045 |
| 2017/0017604 A1* | 1/2017 | Chen | G06F 13/4221 |
| 2017/0308145 A1* | 10/2017 | Gu | G06F 1/32 |
| 2018/0121123 A1* | 5/2018 | Morris | G06F 3/0632 |
| 2018/0275738 A1* | 9/2018 | Pawar | G06F 13/4282 |
| 2019/0384733 A1* | 12/2019 | Jen | G06F 13/4295 |

* cited by examiner

POWER MANAGEMENT OF DISCRETE COMMUNICATION PORT COMPONENTS

CROSS REFERENCE TO RELATED APPLICATIONS

The present application is a national phase entry under 35 U.S.C. § 371 of International Application No. PCT/US2018/015307, filed Jan. 25, 2018, entitled "POWER MANAGEMENT OF DISCRETE COMMUNICATION PORT COMPONENTS", which designated, among the various States, the United States of America. The disclosure of International Application No. PCT/US2018/015307 is hereby incorporated by reference in its entirety.

TECHNICAL FIELD

Embodiments described herein generally relate to the field of power management, and more particularly to the management of power consumption of discrete communication channel components in a computer system.

BACKGROUND

Current industry trends are towards the provision of smaller, lighter and thinner computer systems. In particular, mobile devices, including laptop computers, tablet computers, etc. continue to be reduced in size. Batteries may represent a significant proportion of the bulk of a device in order to provide sufficient useful operating time. Reducing the power consumption of components of the computer system may allow increased operating time or for the battery size to be reduced.

BRIEF DESCRIPTION OF THE DRAWINGS

Embodiments described herein are illustrated by way of example, and not by way of limitation, in the figures of the accompanying drawings in which like reference numerals refer to similar elements.

DESCRIPTION OF EMBODIMENTS

In the following detailed description, like numerals and characters may be used to designate identical, corresponding and/or similar components in differing figure drawings.

Where specific details are set forth in order to describe example embodiments, it should be apparent to one skilled in the art that embodiments may be practices without these specific details.

Illustrative embodiments of the present disclosure include, but are not limited to, methods, systems and apparatuses and machine-readable instructions for managing power consumption of discrete communication channel components in a device or computer system.

Peripheral devices may be coupled to computer systems via communication ports to allow added functionality, for example, keyboards, mice, printers, etc. A common option provided on many computer systems to allow connections of peripheral devices is the USB interface.

Recently, the USB Type-C specification has been introduced that defines a single reversible-plug connector with the capability to support display, power and data functions in a single cable/connector.

In many USB Type-C implementations, discrete components are provided in the data path which may or may not be power optimized due to different vendors' priorities on cost/power/effort tradeoffs. Similarly, some USB Type-A implementations support higher speeds of USB and similarly include discrete components in the data path. These components can contribute to non-trivial amount of power consumption during low power system states, creating issues for long battery life of mobile systems.

Figure 1A:
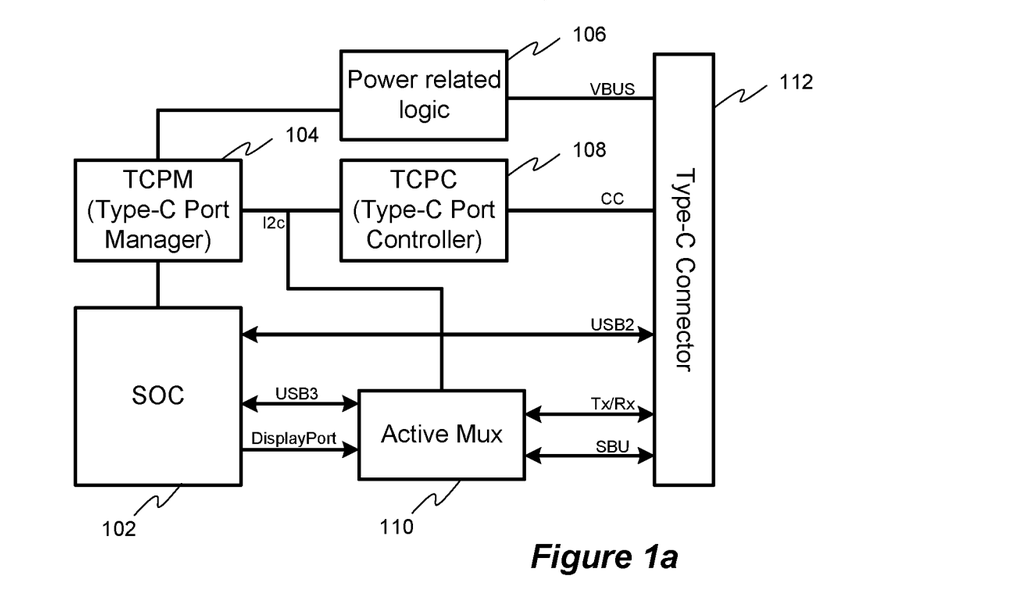
FIG. 1a is a block diagram of an interface including an active multiplexor.

FIG. 1a schematically illustrates a first configuration for coupling a Type-C connector to a system on a chip (SOC). The arrangement of FIG. 1a shows a connector capable of USB and DisplayPort Alternate mode using an active USB/DP multiplexor. In the system 100 of FIG. 1a, a SOC 102 is coupled to a Type-C Port Manager (TCPM) 104 to allow control of Power related logic 106, Type-C Port Controller (TCPC) 108 and the active multiplexor 110. Power related logic 106 manages bus voltage VBUS of the Type-C connector 112. TCPC 108 is coupled to control channel pins of the Type-C connector 112. High-Speed, USB2 signals provided by the SOC 102 are coupled directly to the Type-C connector 112. Super-Speed USB3 signals and/or DisplayPort signals provided by the SOC 102 as required are coupled to active multiplexor 110. Under control of the TCPM 104, the active multiplexor 110 then couples the signals received from the SOC 102 to the Tx/Rx and side band, SBU, pins of the Type-C connector 112.

In the system of FIG. 1a, the use of an active multiplexor means that a repeater, such as a retimer or redriver circuit, is incorporated along with passive multiplexor circuit.

Figure 1B:
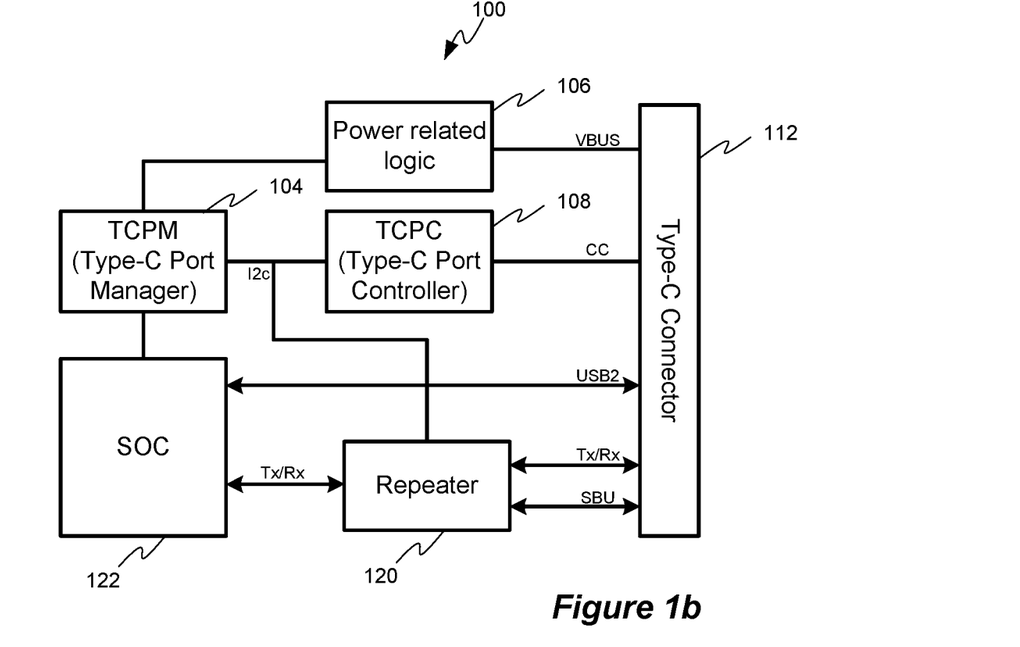
FIG. 1b is a block diagram of an interface including an repeater circuit.

FIG. 1b schematically illustrates a further configuration for coupling a Type-C connector to a system on a chip. The arrangement of FIG. 1b is similar to that of FIG. 1a but includes a USB/DisplayPort multiplexor integrated within the SOC 122. Thus, no separate active multiplexor is required. However, in order to meet implementation requirements, such as tracelength requirements, a repeater circuit 120, such as a retimer or redriver, is provided external to the SOC 122.

Figure 2:
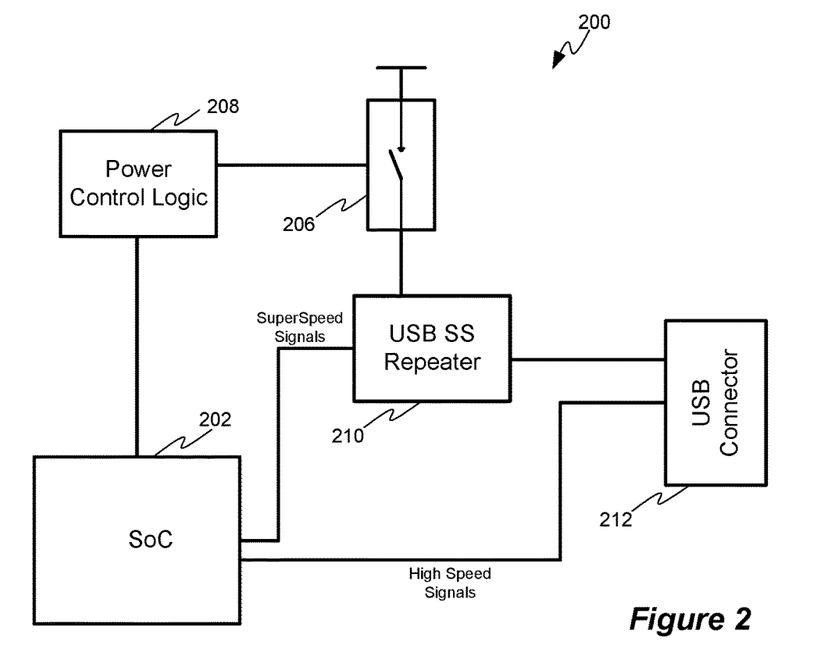
FIG. 2 is a block diagram of an interface including a repeater circuit for generic USB connector.

FIG. 2 schematically illustrates a configuration for coupling a generic USB connector to a system on a chip (SOC). The arrangement of FIG. 2 is similar to that of FIGS. 1a and 1b which includes USB repeater circuit 210 in order to meet implementation requirements, such as tracelength requirements. A repeater circuit 210, such as a retimer or redriver, is provided external to the SOC 202.

Super-Speed signals for the USB port are provided by the SOC 202 to a USB repeater circuit 210 and then coupled to USB connector 212. High-Speed signals are provided directly from the SOC 202 to the USB Connector 212. A power control signal is provided by the Power Control Logic 208 to a power gating circuit 206 to allow power to be selectively removed from the repeater circuit 210. Power control logic could be part of SOC or discrete component on the board. FIG. 2 is used as generic reference to different USB implementations including FIGS. 1a & 1b in rest of the document.

Active multiplexors, or repeaters, such as provided in the examples illustrated in FIGS. 1a, 1b and 2, consume non-negligible amounts of power even in the lowest idle state for the connection. Embodiments may provide intelligent power management of these components to improve the power efficiency of implementations of interconnects incorporating such components, such as USB Type-C connectors in different system states.

A common use case of USB ports is for connecting USB2 devices such as a mouse, a keyboard, a Bluetooth receiver, etc. In such cases, only USB High-Speed signals are used and USB Super-Speed signals are not used.

For USB connectors, the Super-Speed lines are in a powered idle state even when only the High-Speed signals are being used, and therefore any discrete platform components associated with the Super-Speed lines are in an idle state. For the systems of FIGS. 1a, 1b and 2, powering off the active multiplex 110 or repeater 120 or 210 when they are not going to be used at all may represent a significant usage of power over time, especially in the case when the system is in a long duration low power state.

Historically, USB ports did not include any discrete components in the USB data-path and therefore the issue of power management of such components did not arise. Newer standards, such as USB Type-C, provide improved capabilities compared to legacy connectors but also include new discrete components in current implementations. Therefore, existing USB-C implementations may not be power optimized. Similarly, some USB type-A connector implementations may also support higher speed of USB protocol, and include new discrete components in the datapath.

Active discrete components, such as repeaters and retimers, may draw an idle power of as much as 5 mW. Multiple data-paths may be provided in a computer system, corresponding to multiple USB ports. For example, typically OEM implementations may include 4 to 6 connectors each with an associated retimer circuit. Thus, the total power savings available by managing the power of the active components may be significant compared to an overall total system power target.

Embodiments may provide a method of power management of interconnect components, such as USB Type-C, to more efficiently control the power used by discrete platform components when not in use. While the invention is described in the context of the USB Type-C specification, it will be apparent to the skilled person that the described techniques may be similarly applied to USB Type-A connectors, proprietary dock connectors, or to other data paths comprising a high-speed/high-power path and a low-speed/low-power path.

Figure 3:
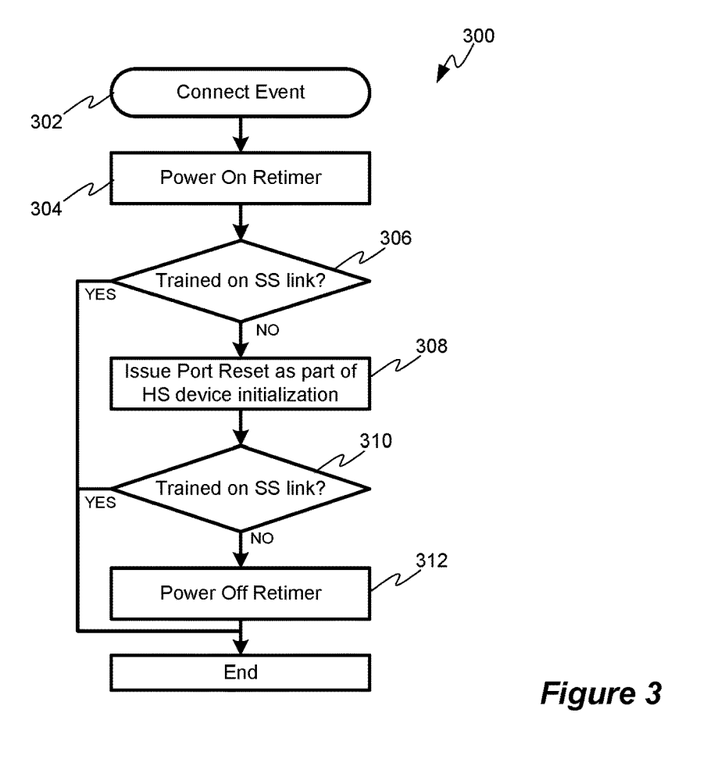
FIG. 3 is a flow chart illustrating a method of connecting a USB device.

FIG. 3 illustrates an example method 300 of operation of the circuit 200 of FIG. 2 when a device is initially coupled to the connector 212. Upon a connect event 302 to a data-path, an active circuit associated with the data-path, such as repeater circuit 210 is powered on 304. It is then determined 306 whether the connection to the device has successfully trained on the SuperSpeed signals. Some devices, such as keyboards and mice, require relatively low data rates for the connection and therefore may not be configured to use Super Speed (SS) signals provided. Such devices may only connect using the High-Speed signals.

If it is determined that the data-path has successfully trained on the SuperSpeed link, the method ends. Alternatively, if the data-path has not trained the on the SS link, a port reset is issued as part of HS initialization 308. A further determination 310 is then made to determine whether the connection to the device has successfully trained on the SS link. If so the method ends. However, if it is again determined that the device has not trained on the SS link, a power control signal may be asserted 312 by the Power Control Logic 208 to power off the USB SS Repeater circuit 210. Otherwise, the repeater circuit 210 remains powered to allow operation of the Super Speed signals.

According to some examples, an Operating System executing on a host computer system may provide information to the USB Port Manager, or Power Control Logic 208, about type of USB device (utilizing either High Speed (HS) pins or Super Speed (SS) Pins) connected to the USB connector. This information may be obtained by the Operating System via a USB driver associated with the device which may indicate whether the device is to operate as a USB2 or USB3 device, for example.

This information may then be passed from the OS to a Platform Policy Manager, for example an embedded controller, through a BIOS.

According to some examples, more aggressive power management of the discrete components could be provided. For devices connected to USB Type-C connectors, it is a requirement for USB3 devices to support backwards compatibility with USB2 signals to allow fallback to the slower USB2, High-Speed, signals for example in the case of link training issues on the Super Speed signal lines. According to some examples, USB3 devices may be forced to reconnect as USB2 devices under certain circumstances to allow the discrete components associated with the Super-Speed signals lines to be powered down.

According to some examples, the Operating System (OS) may obtain information from a USB driver stack about which type of devices are connected to the USB-C connectors so it can determine if active multiplexors/repeaters in the system are really in use. If the USB3 devices are about to go to low power state or not connected before low power system state entry, a port reset would be issued by the platform agent for the corresponding Super Speed ports (for example an embedded controller, EC) to the OS and the devices would be reconnected on the High-Speed ports. The retimers may then be powered off or switched to a lowest power state in this case.

Figure 4:
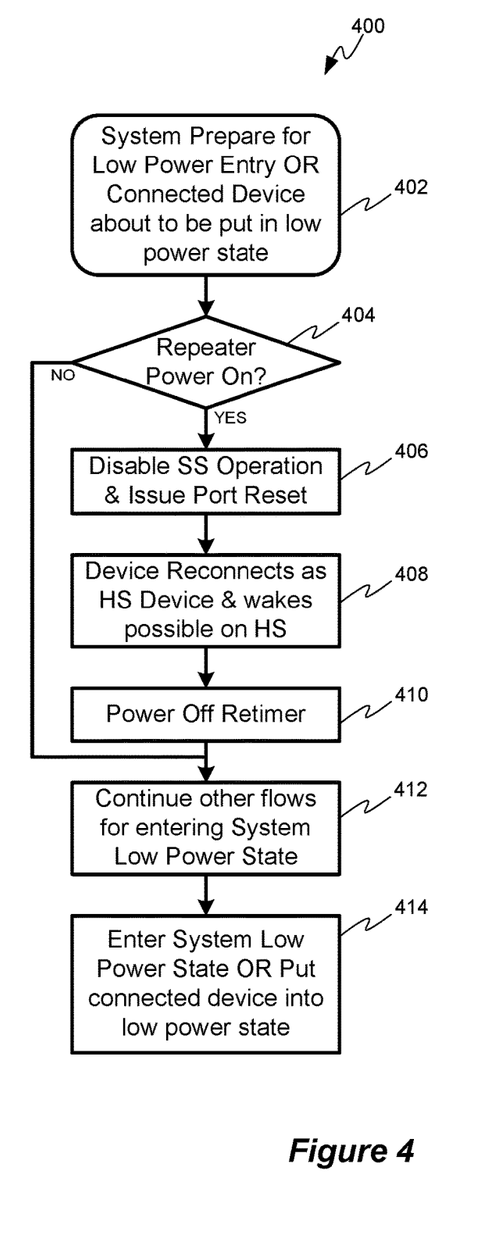
FIG. 4 is a flow chart illustrating a method of reconnecting a device in response to a system or connected device entering a low power state.

FIG. 4 illustrates a method 400 of reconnecting USB3 devices to a USB2 port to allow an associated repeater circuit 210 to be powered down, for example in the case when the connected device is about to be put to low power state or when computer system is moving to a low power state such as an ACPI Sx state. According to the method 400 of FIG. 4, when the system is preparing for entry into a low power state 402, a determination 404 is made for a data-path to determine whether a discrete component associated with the data-path, such as a repeater 210, is powered on. If not powered on, the system continues 412 with other flows for entering the connected device or System in Low Power State.

If the discrete component associated with the data-path is determined to be powered on, SuperSpeed operation of the data path is disabled and a port reset is then issued 406 on the port to instruct the device to reconnect to the computer system. As SuperSpeed operation is disabled, the device falls back to USB2 operation and reconnects 408 to the High-Speed lines. Once the device has reconnected to the USB2 port, the repeater 210 associated with the USB3 signals may be powered down 410, and the computer system continues 412 with other flows for entering the connected device or System in Low Power State. Once the other flows are completed, the connected device or computer system may then subsequently move to the low power state 414.

This arrangement enables the system to be awoken by a connected device and provides a good balance between power savings and functionality (i.e. when in normal power state, higher speeds offered by SuperSpeed USB is used for faster data transfer but at the same time in low power state wake capability is supported over HighSpeed USB lines)

Prior to the system moving to a low power system Sx state, the OS may provide the BIOS with an indication of the port partner, i.e. connected device, capability and the BIOS may then pass this information to the embedded controller which can use this information to power off the active discrete circuitry associated with the Super Speed signals.

As the BIOS is the last software entity to go down during the transition of the system to the low power Sx state, the BIOS may be best placed to manage the transition of the data-paths to the low power state.

Thus, according to some examples, all USB3 connections to the system are reset on entry to the low-power state such that the corresponding devices reconnect to the data-path using USB2. Retimers and nay other active circuits associated with the USB3 signals may then be powered down completely while the system is in the low power state while maintaining the connection to the devices using the USB2 path. This allows the normal operation of devices during the low power state to be maintained, for example allowing the device to signal the computer system to wake, while reducing the power consumed by the discrete circuitry associated with the USB3 signals.

After resuming to the S0 state, USB3 devices may be re-enumerated and desired performance can be achieved when system is awake plus power savings are achieved when system is in low-power state without sacrificing the wake functionality.

Figure 5:
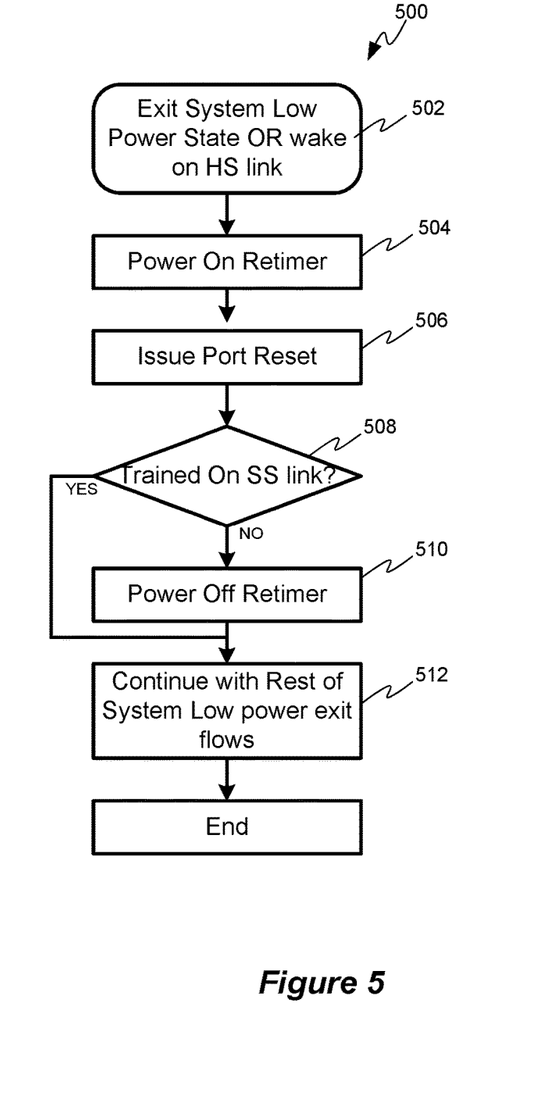
FIG. 5 is a flow chart illustrating a method of reconnecting a device in response to a wake on USB connector or system waking from a low power state due to some other reason.

FIG. 5 illustrates a method 500 of resume operation following a wake event. The computer system may resume normal operation from the low power mode, for example moving from an Sx state to a S0 state. According to the method 500 of FIG. 5, in response to a wake event that may cause the system to exit the low power state 502, a discrete circuit, such as repeater 210, associated with a data-path is powered on 504 and a port reset is issued 506 for the data-path. A determination is then made to determine 508 if the device has successfully trained on the SS link when reconnecting. If it is determined that the data-path has not trained on the SS link, the discrete circuit is powered off 510.

Alternatively, if it is determined that the data-path has successfully trained on the SS link, the retimer circuit remains powered on and the system continues 512 with control flows associated with exit from the low power state.

Thus, on resume to S0 from an Sx system state (e.g. device connection or other wake events), the EC may restore the state of repeaters 210 for connected data-paths. If a port reset is need this may be communicated by the EC to the OS and then the OS may issue the port reset to the USB ports and the devices would then be reconnected on the Super Speed, USB3, ports. This saves the idle power associated with the retimer circuits during Sx and allows the system to wake up retimers upon resuming operation. For computer systems that may be in Sx state for a relatively long time, this scheme may reduce power consumption of the system in the low power state and help preserve battery life.

While the above methods the low power state has been exemplified by an ACPI Sx power state, it will be recognized that the disclosed methods may also be applied to a SOix system state.

Figure 6:
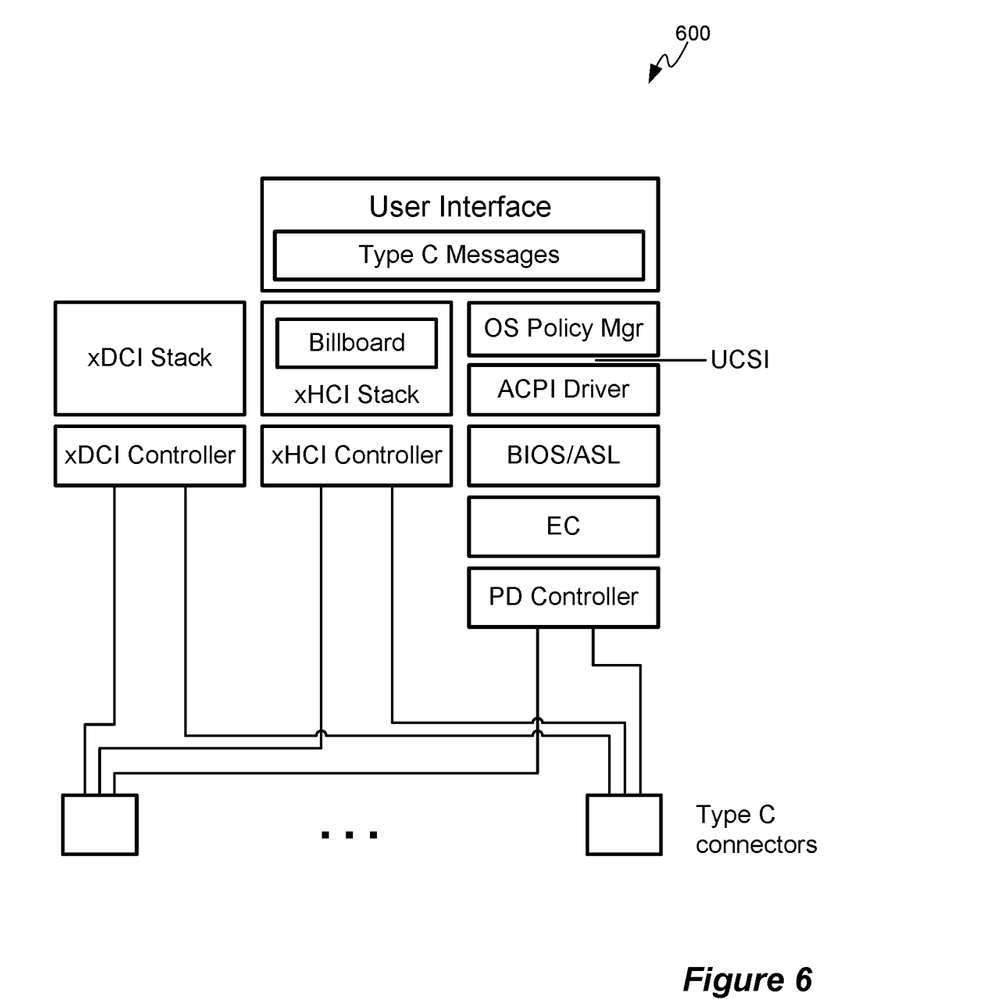
FIG. 6 is a block diagram illustrating a firmware based interface suitable for implementing examples.

FIG. 6 illustrates software and firmware elements of the USB control stack that may be used to facilitate communication between the operating system and the USB Type-C hardware to implement the above described methods.

According to some examples a USB Type-C Port Manager is provided as a platform level firmware/software component as part of a Platform/SoC and has direct interaction with the USB Type-C hardware components. This could be implemented in the form of Embedded Controller firmware or the client driver at the Operating system level. Irrespective of the implementation, this component may be directly tied to and aware of the Platform power state. It communicates that information to the discrete USB Type-C hardware components.

According to some examples a Platform BIOS/ACPI is the Platform specific firmware that is responsible for bringing up the SoC as well as the rest of the platform and booting to Operating System with all functionality enabled. The firmware may communicate with the Operating System as well as the platform. In some examples, the Platform BIOS is the first to know of the connection or disconnection events and platform power state change request from the Operating System. The Platform BIOS may then relay this request to the port manager and may ensure that the rest of the platform is in sync with the actions performed by the port manager on the discrete hardware.

Figure 7A:
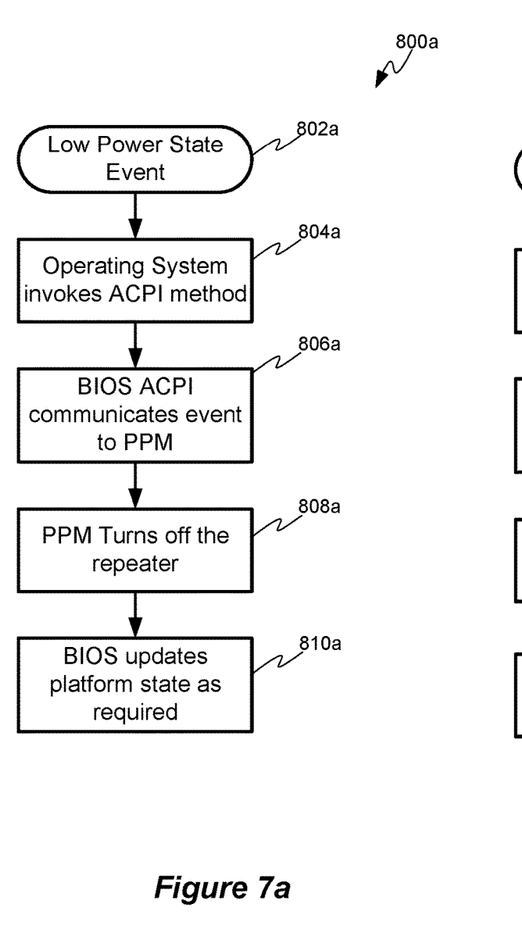
FIG. 7a is a flow chart illustrating the SW flows for power managing discrete components to prepare for system low power entry event or for placing a connected device in low power mode.

FIG. 7*a* illustrates a method 800 of power managing data-path discrete components to prepare for system low power entry event or for placing a connected device in low power mode. According to the method 800*a* illustrated in FIG. 8*a*, the method begins with the operating system triggering 802*a* a power state change. The operating system then invokes 804*a* a system BIOS ACPI method to trigger the platform hardware to move to the low power state. The BIOS ACPI then indicates 806*a* triggering of the platform state change to the Platform Policy Manager, i.e. the embedded controller firmware or the client driver associated with the data-path. The Platform Policy Manager turns off 808*a* the active components of the Super Speed signal paths. Once the Super Speed link has been disabled, the Platform Policy Manager, or USB Type-C Port Manager, informs the System BIOS and the BIOS triggers the hardware changes to perform the low power state entry as described in 810*a*.

Figure 7B:
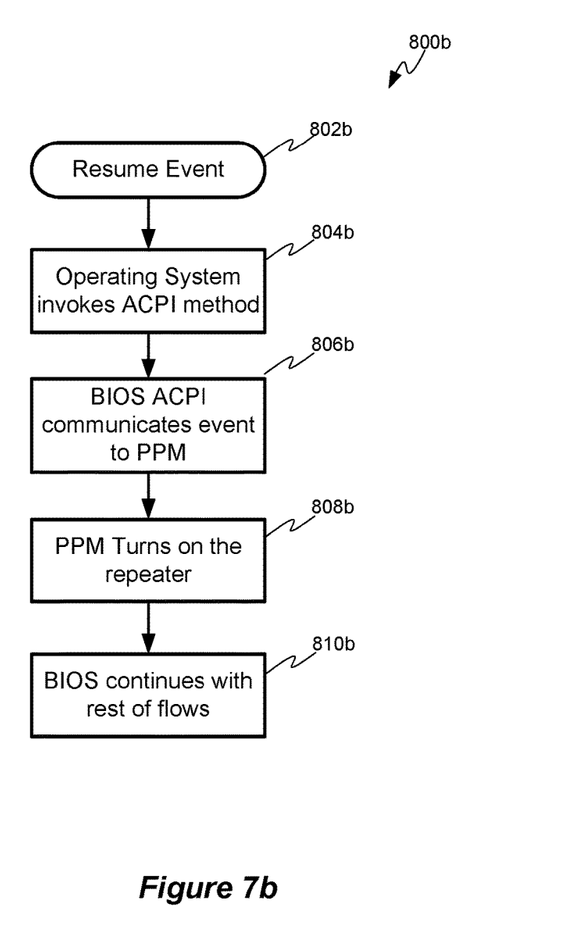
FIG. 7b is a flow chart illustrating the SW flows for power managing the discrete components in response to low power exit event.

FIG. 7*b* illustrates a method 800*b* of bringing up data-path discrete components in response to a low power exit event. According to the method 800*b* illustrated in FIG. 8*b*, upon a subsequent exit from the low power state 802*b*, the OS will invoke ACPI method 804*b*. BIOS ACPI communicates with Platform Policy Manager 806*b*. Platform Policy Manager may restore the power state of the active discrete components for connected Super Speed signal lines and reconnects the devices to provide full functionality on the Super Speed port 808*b*. The System BIOS will continue with rest of the flows 810*b*.

While the various examples above have been described in the context of USB signals, it will be recognized that the disclosed methods can be similarly applied to any data-path comprising a high-speed port and a low-speed port and including discrete components associated with one or other of the ports.

In this specification, the phrase "at least one of A or B" and the phrase "at least one of A and B" and should be interpreted to mean any one or more of the plurality of listed items A, B etc., taken jointly and severally in any and all permutations.

Where functional units have been described as circuitry, the circuitry may be general purpose processor circuitry configured by program code to perform specified processing functions. The circuitry may also be configured by modification to the processing hardware. Configuration of the circuitry to perform a specified function may be entirely in hardware, entirely in software or using a combination of hardware modification and software execution. Program instructions may be used to configure logic gates of general purpose or special-purpose processor circuitry to perform a processing function.

Circuitry may be implemented, for example, as a hardware circuit comprising processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate arrays (FPGAs), logic gates, registers, semiconductor devices, chips, microchips, chip sets, and the like.

The processors may comprise a general-purpose processor, a network processor that processes data communicated over a computer network, or other types of processor including a reduced instruction set computer RISC or a complex instruction set computer CISC. The processor may have a single or multiple core design. Multiple core processors may integrate different processor core types on the same integrated circuit die Machine readable program instructions may be provided on a transitory medium such as a transmission medium or on a non-transitory medium such as a storage medium. Such machinereadable instructions (computer program code) may be implemented in a high level procedural or object oriented programming language. However, the program(s) may be implemented in assembly or machine language, if desired. In any case, the language may be a compiled or interpreted language, and combined with hardware implementations.

Embodiments of the present invention are applicable for use with all types of semiconductor integrated circuit ("IC") chips. Examples of these IC chips include but are not limited to processors, controllers, chipset components, programmable logic arrays (PLAs), memory chips, network chips, and the like. In some embodiments, one or more of the components described herein may be embodied as a System On Chip (SOC) device. A SOC may include, for example, one or more Central Processing Unit (CPU) cores, one or more Graphics Processing Unit (GPU) cores, an Input/Output interface and a memory controller. In some embodiments, a SOC and its components may be provided on one or more integrated circuit die, for example, packaged into a single semiconductor device.

EXAMPLES

The following examples pertain to further embodiments.

Example 1 is a method of managing power consumption of a data-path in a computer system, the data-path comprising a first port and a second port, the first port comprising a high-speed port and the second port comprising a low-speed port, the method comprising connecting a device to the data-path, determining that the connected device is to communicate using the second port, and turning off an active circuit associated with the first port of the data-path.

Example 2 comprises the method of Example 1 wherein connecting the device to the data-path comprises connecting the device to the second port of the data path, and wherein determining that the connected device is to communicate using the second port further comprises determining that the connected device is not configured to communicate using the first port.

Example 3 comprises the method of Example 1 wherein the data-path comprises a USB data-path and wherein the first port comprises USB Super-Speed signals and the second port comprises USB High-Speed signals.

Example 4 comprises the method of Example 3 wherein the data-path comprises one of a USB Type-C connector and a USB Type-A connector Example 5 comprises the method of Example 1 wherein the active circuit comprises one of: a retimer circuit, a redriver circuit, and an active multiplexor.

Example 6 comprises the method of Example 3, wherein determining that the device is to communicate using the second port further comprises obtaining information from a USB driver stack associated with the USB data-path, the information indicating the connected device is not configured to make use of USB Super-Speed signals.

Example 7 comprises the method of Example 1, wherein connecting the device to the data-path comprises connecting the device to the first port, and wherein determining that the connected device is to communicate using the second port further comprises determining that the connected device is to enter a low power state.

Example 8 comprises the method of Example 7 further comprising, in response to determining that the connected device is to enter the low power state inhibiting reconnection of the device to the first port of the data-path, issuing a reset for the data-path, and reconnecting the device to the second port of the data-path.

Example 9 comprises the method of Example 7 wherein determining that the device connected to the first port of the data-path is to enter a low power state comprises one of obtaining an indication that the computer system is to enter a low power state, and obtaining an indication that the device is to enter a low power state.

Example 10 comprises the method of Example 8, further comprising the computer system entering the low power state subsequent to the device being reconnected to the second port of the data-path.

Example 11 comprises the method of Example 7, further comprising obtaining an indication that the connected device is to wake from the low power state, turning on the active circuit associated with the first port, issuing a reset to the second port of the data-path, and reconnecting the device to the first port of the data-path.

Example 12 comprises the method of Example 6, wherein the low power state comprises an ACPI Sx system power state.

Example 13 comprises the method of Example 8 wherein the indication that the computer system is to wake from the low power state comprises an indication that the computer is to enter an ACPI S0 wake state.

Example 14 comprises the method of Example 11, further comprising receiving an indication that the device has reconnected to the first port of the data-path from a port manager associated with the data-path, and in response to receiving the indication, waking the computer system from the low power state.

Example 15 comprises the method of Example 1, wherein the method is performed by a BIOS of a computer system.

Example 16 comprises the method of Example 11, wherein issuing a reset further comprises in response to receiving the reset at the operating system, the operating system instructing a reset of the first port.

Example 17 comprises an apparatus for managing power consumption of a data-path in a computer system, the data-path comprising a first port and a second port, the first port comprising a high-speed, high-power port and the second port comprising a low-speed, low-power port, the apparatus comprising a power control circuit to selectively control power provided to an active circuit associated with the first port of the data-path, and a control module to receive an indication that a device connected to the data-path is to communicate using the second port, and in response to receiving the indication that the device is to communicate using the second port, instruct the power control circuit to power off the active circuit.

Example 18 comprises the apparatus of Example 17 wherein the data-path comprises a USB data-path and wherein the first port comprises USB Super-Speed signals and the second port comprises USB High-Speed signals.

Example 19 comprises the apparatus of Example 18, wherein the data-path comprises a USB Type-C, a USB Type-A, or any other USB connection.

Example 20 comprises the apparatus of Example 17, wherein the indication that a device connected to the data-path is to communicate using the second port comprises an indication that the device is not configured to communicate using the first port Example 21 comprises the apparatus of Example 17, wherein the active circuit comprises one of: a retimer circuit, a redriver circuit, and an active multiplexor.

Example 22 comprises the apparatus of Example 18, wherein the indication that a device connected to the data-path is to communicate using the second port comprises obtaining an indication from a USB driver stack associated with the USB data-path that the connected device is not configured to make use of USB Super-Speed signals.

Example 23 comprises the apparatus of Example 17, wherein the indication that a device connected to the data-path is to communicate using the second port comprises an indication that the connected device is to enter a low power state.

Example 24 comprises the apparatus of Example 23, wherein the control module is further to in response to determining that the connected device is to enter the low power state, inhibit reconnection of the device to the first port of the data-path, issue a reset for the first port of the data-path to cause the device to reconnect to the second port of the data-path.

Example 25 comprises the apparatus of Example 24, wherein the control module is further to in response to determining that the connected device is to wake from the low power state and turn on the active circuit associated with the first port, and issue a reset to the second port of the data-path to cause the device to reconnect to the first port of the data-path.

Example 26 comprises the apparatus of Example 25, wherein the control module is further to receive an indication that the device has reconnected to the first port of the data-path from a port manager associated with the data-path, and in response to receiving the indication, wake the computer system from the low power state.

Example 27 comprises the apparatus of Example 17, wherein the control module comprises one of: an operating system, an embedded controller, a BIOS, or a platform manager.

Example 28 comprises a system comprising the apparatus of Example 17 and further comprising a data-path comprising a first port and a second port, the first port comprising a high-speed, high-power port and the second port comprising a low-speed, low-power port, at least one connector for coupling a device to the data-path, an active circuit associated with the first port of the data-path, and a power control circuit to selectively power off the active circuit.

Example 29 comprises a computer program product comprising computer program code that when executed causes processing hardware to connect a device to the data-path comprising a first port and a second port, the first port comprising a high-speed port and the second port comprising a low-speed port, determine that the connected device is to communicate using the second port, and turn off an active circuit associated with the first port of the data-path.

Example 30 comprises an apparatus for managing power consumption of a data-path in a computer system, the data-path comprising a first port and a second port, the first port comprising a high-speed, high-power port and the second port comprising a low-speed, low-power port, the apparatus comprising a power control means to selectively control power provided to an active circuit associated with the first port of the data-path, and a control means to receive an indication that a device connected to the data-path is to communicate using the second port, and in response to receiving the indication that the device is to communicate using the second port, instruct the power control means to power off the active circuit.

The invention claimed is:

1. A method of managing power consumption of a data path to a device in a computer system, the data path comprising a first port and a second port, the first port comprising a high-speed port and the second port comprising a low-speed port, the method comprising:
    connecting the device to the data path;
    determining that the connected device is to communicate using the second port;
    changing a state of a repeater circuit associated with the first port of the data path to a low power state based on the determination; and
    removing power from the repeater circuit.

2. The method of claim 1, wherein connecting the device to the data path comprises connecting the device to the second port of the data path, and wherein determining that the connected device is to communicate using the second port further comprises determining that the connected device is not configured to communicate using the first port.

3. The method of claim 1, wherein the data path comprises a USB data path and wherein the first port comprises USB Super-Speed signals and the second port comprises USB High-Speed signals.

4. The method of claim 3, wherein the data path comprises one of a USB Type-C connector and a USB Type-A connector.

5. The method of claim 3, wherein determining that the device is to communicate using the second port further comprises:
    obtaining information from a USB driver stack associated with the USB data path, the information indicating the connected device is not configured to make use of the USB Super-Speed signals.

6. The method of claim 1, wherein connecting the device to the data path comprises connecting the device to the first port, and wherein determining that the connected device is to communicate using the second port further comprises:
   determining that the connected device is to enter a low-power state.

7. The method of claim 6, further comprising, in response to determining that the connected device is to enter the low-power state:
   inhibiting reconnection of the device to the first port of the data path;
   issuing a reset for the first port of the data path; and
   reconnecting the device to the second port of the data path.

8. The method of claim 6, wherein determining that the device connected to the first port of the data path is to enter a low-power state comprises one of:
   obtaining an indication that the computer system is to enter a low-power state; and
   obtaining an indication that the device is to enter a low-power state.

9. The method of claim 7, further comprising the computer system entering the low-power state subsequent to the device being reconnected to the second port of the data path.

10. The method of claim 6, further comprising:
    obtaining an indication that the connected device is to wake from the low-power state;
    turning on an active circuit associated with the first port;
    issuing a reset to the second port of the data path; and
    reconnecting the device to the first port of the data path.

11. The method of claim 6, wherein the low-power state comprises an ACPI Sx system power state.

12. The method of claim 8, wherein the indication that the computer system is to wake from the low-power state comprises an indication that the computer system is to enter an ACPI S0 wake state.

13. The method of claim 1, wherein the method is performed by a BIOS of the computer system.

14. An apparatus for managing power consumption of a data path in a computer system, the data path comprising a first port and a second port, the first port comprising a high-speed and the second port comprising a low-speed port, the apparatus comprising:
    a power control circuit to selectively control power provided to an active circuit associated with the first port of the data path;
    a control circuit to:
       receive an indication that a device connected to the data path is to communicate using the second port;
       in response to receiving the indication that the device is to communicate using the second port, instruct the power control circuit to change a state of a retimer circuit of the active circuit to a low-power state; and
       powering off the active circuit.

15. The apparatus of claim 14 wherein the data path comprises a USB data path and wherein the first port comprises USB Super-Speed signals and the second port comprises USB High-Speed signals.

16. The apparatus of claim 15, wherein the data path comprises a USB Type-C, a USB Type-A, or any other USB connection.

17. The apparatus of claim 14, wherein the indication that the device connected to the data path is to communicate using the second port comprises an indication that the device is not configured to communicate using the first port.

18. The apparatus of claim 14, wherein the indication that the device connected to the data path is to communicate using the second port comprises an indication that the device is to enter a low-power state.

19. The apparatus of claim 18, wherein the control circuit is further to:
    in response to determining that the device is to enter the low-power state:
       inhibit reconnection of the device to the first port of the data path; and
       issue a reset for the first port of the data path to cause the device to reconnect to the second port of the data path.

20. The apparatus of claim 19, wherein the control circuit is further to:
    in response to determining that the device is to wake from the low-power state:
       turn on the active circuit associated with the first port; and
       issue a reset to the second port of the data path to cause the device to reconnect to the first port of the data path.

21. The apparatus of claim 14, wherein the control circuit comprises one of: an operating system, an embedded controller, a BIOS, or a platform manager.

22. A non-transitory computer-readable medium comprising computer program code that when executed causes processing hardware to:
    connect a device to a data path, the data path comprising a first port and a second port, the first port comprising a high-speed port and the second port comprising a low-speed port;
    determine that the connected device is to communicate using the second port;
    change a state of an active circuit associated with the first port of the data path based on the determination; and
    removing power from the active circuit.

23. The non-transitory computer-readable medium of claim 22, wherein the processing hardware is to determine that the connected device is to communicate using the second port based on an indication that the connected device is to enter a low-power state.

* * * * *